US008891012B2

(12) United States Patent
Fazzini

(10) Patent No.: US 8,891,012 B2
(45) Date of Patent: Nov. 18, 2014

(54) DE-INTERLACING OF VIDEO DATA

(75) Inventor: Paolo Fazzini, Rome (IT)

(73) Assignee: Imagination Technologies, Limited, Kings Langley, Hertfordshire (GB)

(*) Notice: Subject to any disclaimer, the term of this patent is extended or adjusted under 35 U.S.C. 154(b) by 989 days.

(21) Appl. No.: 12/930,373

(22) Filed: Jan. 5, 2011

(65) Prior Publication Data

US 2012/0075527 A1 Mar. 29, 2012

(30) Foreign Application Priority Data

Sep. 23, 2010 (GB) .................................. 1016024.0

(51) Int. Cl.
*H04N 7/01* (2006.01)
*H04N 11/20* (2006.01)
*H04N 11/22* (2006.01)

(52) U.S. Cl.
CPC .................................... *H04N 7/012* (2013.01)
USPC ........................... 348/448; 348/452; 348/45.8

(58) Field of Classification Search
CPC .. G09G 2320/0257; G06T 7/20; G06T 7/204; G06T 7/2013; H04N 5/44; H04N 5/144; H04N 5/145; H04N 7/012; H04N 7/0127; H04N 7/0145; H04N 7/0135; H04N 7/0137; H04N 19/003; H04N 19/00272; H04N 19/00278; H04N 19/0145; H04N 19/00703
USPC ................................................. 348/448, 452
See application file for complete search history.

(56) References Cited

U.S. PATENT DOCUMENTS 5,347,599 A * 9/1994 Yamashita et al. ............ 382/278
5,661,525 A * 8/1997 Kovacevic et al. ............ 348/452
7,098,957 B2 * 8/2006 Kim et al. ..................... 348/452
7,336,316 B2 * 2/2008 Fazzini ......................... 348/448
7,518,655 B2 * 4/2009 Fazzini ......................... 348/448
7,580,077 B2 * 8/2009 Fazzini ......................... 348/448
7,773,151 B2 * 8/2010 Barnichon .................... 348/448
8,199,252 B2 * 6/2012 Chung .......................... 348/452
2003/0077001 A1 * 4/2003 Yamashita et al. ............ 382/276

(Continued)

FOREIGN PATENT DOCUMENTS

| | | | |
|---|---|---|---|
| GB | 2 422 974 | A | 8/2006 |
| GB | 2 422 976 | A | 8/2006 |
| WO | 99/19834 | | 4/1999 |
| WO | 2006085062 | | 8/2006 |

OTHER PUBLICATIONS

Great Britain Patent Office Search Report dated Jan. 20, 2011 (1 page).

(Continued)

*Primary Examiner* — Brian Yenke
(74) *Attorney, Agent, or Firm* — Michael S. Garrabrants

(57) ABSTRACT

A method for converting an interlaced video signal to a non-interlaced video signal, comprising, for each pixel in each missing line of a video field in the interlaced video signal: deriving a correlation data set comprising correlation data for each of a plurality of possible interpolation schemes to be used in reconstructing the pixel; dividing each correlation data set into a plurality of correlation data zones; selecting an interpolation scheme from each correlation data zone; reconstructing the pixel using a blend of the selected interpolation schemes, wherein the blend for each pixel subsequent to a first pixel is determined based on the result of a comparison between the selected interpolation schemes and based on the blend used for a preceding pixel.

24 Claims, 3 Drawing Sheets

(56) References Cited

U.S. PATENT DOCUMENTS

2004/0091046 A1* 5/2004 Akimoto et al. ......... 375/240.12
2004/0109085 A1* 6/2004 Jung et al. ..................... 348/452
2004/0165662 A1* 8/2004 Battistella ................ 375/240.01
2005/0036061 A1* 2/2005 Fazzini ......................... 348/448
2005/0128356 A1* 6/2005 Babonneau et al. .......... 348/607
2006/0039631 A1 2/2006 Chao
2006/0176394 A1* 8/2006 Fazzini ......................... 348/448
2006/0222269 A1* 10/2006 Ohno ............................ 382/300
2006/0256237 A1* 11/2006 Barnichon .................... 348/448
2008/0170808 A1 7/2008 Nakagata
2010/0111182 A1* 5/2010 Karczewicz et al. .... 375/240.16
2010/0157147 A1 6/2010 Bellers

OTHER PUBLICATIONS

International Search Report and Written Opinion PCT/GB2011/001286.

International preliminary report on patentability PCT/GB2011/011286 Apr. 4, 2013.

* cited by examiner

DE-INTERLACING OF VIDEO DATA

FIELD OF THE INVENTION

The invention relates to a method and apparatus for de-interlacing an interlaced video signal to a progressive scan or de-interlaced video signal.

BACKGROUND TO THE INVENTION

Broadcast television signals are usually provided in an interlaced form. For example, the phase alternate line (PAL) system used in Europe is made of video frames comprising two interlaced fields. Each field comprises alternate is lines of the frame. Thus when the signal is applied to a display, the first field will be applied to the odd numbered lines of the display followed by the second field being to the even numbered lines of the display. Frame rate, the rate at which frames comprising two interlaced fields are applied to a display is usually 50 Hz, and therefore field rate is 100 Hz. Thus, if each field is converted to a whole frame of video data, i.e. the missing lines in each field are somehow generated, the effective frame rate will be 100 Hz. This also has the advantage of increasing the resolution of the television picture.

There are various ways that have been proposed to generate the missing lines in a field of video data. Typically, the missing lines are generated by an interpolation technique using adjacent pixels (adjacent either temporarily or spatially, or both) to generate each missing pixel.

FIG. 1 illustrates schematically three different possible interpolation schemes using spatially adjacent pixels to generate the missing pixels. The middle scheme shown comprises correlation of the data from pixels above and below the pixel to be reconstructed and correlation of data from pairs of pixels immediately adjacent to this. The scheme on the left hand side of FIG. 1 comprises correlation between pixels on lines which pass diagonally sloping down to the right of the pixel being reconstructed. The same process with the opposite diagonals is shown in the right hand example of FIG. 1.

In the examples shown in FIG. 1, the correlation between the data and the various pairs of pixels are derived using the sum of absolute differences (SAD) technique.

A comparison is made between the various interpolation schemes, e.g. SAD0, SAD1, SAD2 etc as illustrated in FIG. 1, in order to select the best one. This is shown graphically on the right hand side of FIG. 1. This graph of the SAD results of the possible interpolation schemes is called the correlation curve. Typically, the interpolation scheme which gives the smallest difference in SAD is used as the interpolation to reconstruct the missing pixel. The process is carried out for each pixel, so that different interpolation schemes may be used for adjacent pixels.

An interpolation scheme of this type, using both spatial and temporal interpolation, is described in more detail in GB 2422974. This type of interpolation scheme generally gives goods results. However, there is a problem that such a scheme can yield a high frequencies within a reconstructed line of video data when the interpolation scheme used jumps rapidly from pixel to pixel. This problem is greatest when the minimum of the correlation curve jumps from one side of the curve to the other for adjacent pixels.

Accordingly there is a need to improve the interpolation techniques of the prior art and in particular to prevent the generation of high frequencies along the reconstructed scan line owning to rapid changes in selected interpolation schemes.

SUMMARY OF INVENTION

The present invention is defined in the appended independent claims, to which reference should be made. Preferred features are set out in the dependent claims.

In accordance with an embodiment of the present invention, there is provided a method for converting an interlaced video signal to a non-interlaced video signal, comprising the steps of:

for each pixel in each missing line of a video field in the interlaced video signal:

deriving a correlation data set comprising correlation data for each of a plurality of possible interpolation schemes to be used in reconstructing the pixel;

dividing each correlation data set into a plurality of correlation data zones;

selecting an interpolation scheme from each correlation data zone;

reconstructing the pixel using a blend of the selected interpolation schemes, wherein the blend for each pixel subsequent to a first pixel is determined based on the result of a comparison between the selected interpolation schemes and based on the blend used for a preceding pixel.

With a method in accordance with the invention the interpolation scheme used for adjacent pixels does not change rapidly, as the interpolation scheme used for each pixel is partially based on the interpolation scheme used for the preceding pixel. Changes in interpolation scheme along a reconstructed line are therefore gradual and high frequency components are reduced.

Preferably, the method further comprises the step of displaying the reconstructed pixel on a display.

Preferably the blend is determined based on the blend used for the immediately preceding pixel in the missing line in the video field. Preferably the blend is reset to a predetermined blend at the beginning or end of each missing line in the video field.

Preferably, the method further comprises the step of comparing the correlation data for the selected interpolation schemes with one another.

Preferably, the blend of selected interpolation schemes comprises a weighted sum of the result of each of the selected interpolation schemes wherein weight coefficients in the weighted sum are incremented or decremented from the weight coefficient for the interpolation scheme from the same correlation data zone used for the immediately preceding pixel, the amount of increment or decrement being based on the result of the step of comparing the correlation data for the selected interpolation schemes with one another.

Preferably, the step of comparing results in a determination of the interpolation scheme likely to give the best result. Preferably, the weight coefficient for the interpolation scheme determined to be the best of the selected interpolation schemes is incremented from the weight coefficient for the interpolation scheme from the same correlation data zone used for the immediately preceding pixel.

Preferably, the step of dividing each correlation data set into a plurality of correlation data zones comprises dividing the correlation data into zones in accordance with the spatial or temporal properties of the corresponding interpolation schemes.

Preferably, the correlation data for each interpolation scheme is a measure of the correlation between pixel pairs using that interpolation scheme.

Preferably, the step of selecting an interpolation scheme from each correlation data zone comprises selecting an interpolation scheme from each correlation data zone having the greatest degree of correlation between pixel pairs using that interpolation scheme.

Alternatively, the step of selecting an interpolation scheme from each correlation data zone comprises selecting an interpolation scheme for each correlation data zone for which the correlation data is the lowest local minimum in that correlation data zone in a graphical representation of the correlation data set, and, if no local minimum exists for a correlation data zone, selecting an interpolation scheme for which the correlation data is the absolute minimum for that correlation data zone, wherein a lower value for correlation data in the graphical representation indicates a greater degree of correlation between pixel pairs using the corresponding interpolation scheme.

Preferably, the number of correlation data zones is three or greater.

The possible interpolation schemes can include spatial interpolation schemes, temporal interpolation schemes, or a combination of spatial and temporal interpolation schemes. The number of pairs of pixels used to calculate each correlation datum is preferably between 7 and 30.

In a second aspect of the invention there is provided an apparatus for converting an interlaced video signal to a non-interlaced video signal comprising:

- means for deriving a correlation data set comprising correlation data for each of a plurality of possible interpolation schemes to be used in reconstructing a pixel in a missing line of a video field in the video signal;
- means for dividing each correlation data set into a plurality of correlation data zones;
- means for selecting an interpolation scheme from each correlation data zone;
- means for reconstructing the pixel using a blend of the selected interpolation schemes, wherein the blend for each pixel subsequent to a first pixel is determined based on the result of a comparison between the selected interpolation schemes and based on the blend used for a preceding pixel.

BRIEF DESCRIPTION OF THE DRAWINGS

Embodiments of the present invention will be described in detail, by way of example only, with reference to the accompanying drawings, in which.

DETAILED DESCRIPTION

Figure 1:
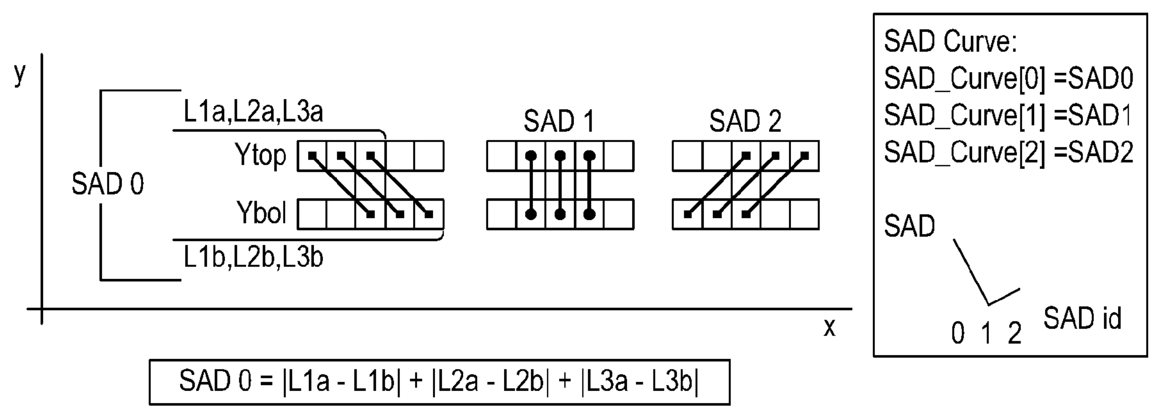
FIG. 1 is a schematic illustration of possible interpolation schemes for interpolating missing pixels in a video field.

FIG. 1 illustrates an example of a set of interpolation schemes that can be used in a method and system in accordance with the present invention. FIG. 1 shows schematically three different possible interpolation schemes using spatially adjacent pixels to generate a missing pixel in a line of video data. The middle scheme shown comprises correlation of the data from pixels above and below the pixel to be reconstructed and correlation of data from pairs of pixels immediately adjacent to this. The scheme on the left hand side of FIG. 1 comprises correlation between pixels on lines which pass diagonally sloping down to the right of the pixel being reconstructed. The same process with the opposite diagonals is shown in the right hand example of FIG. 1.

In the examples shown in FIG. 1, the correlation between the data and the various pairs of pixels are derived using the sum of absolute differences (SAD) technique. Other well known statistical techniques may equally be used, such as the mean square error (MSE).

The input to the SAD algorithm is the luminance of the pixels in the lines above and below the pixel to be reconstructed in a field. The SAD correlation value is calculated as $$SAD=|L1a-L1b|+|L2a-L2b|+|L3a-L3b|$$

Where Lna is the luminance value of the nth pixel in the row above the missing line and Lnb is the luminance of the nth pixel in the row below the missing line.

In different interpolation schemes of the type shown in FIG. 1, the position of the nth pixel in the lines above and below the missing pixel are shifted relative to one another by different values.

The graph on the right hand side of FIG. 1 shows an example of an SAD based calculation using only five pixels for each row, and three correlations of symmetrically located sets of pixels each made up of three pixel pairs. In practice, more pixels are involved in the computation to ensure greater accuracy. In a preferred embodiment 25 pixels in each row and 13 pixel pairs are used.

If an SAD approach to comparing the values of pairs of pixels is used, then comparison is made between the various interpolation schemes, SAD0, SAD1, SAD2 etc as illustrated in FIG. 1. This is shown graphically on the right hand side of FIG. 1. This graph of the SAD results of the possible interpolation schemes is called the correlation curve.

Figure 2:
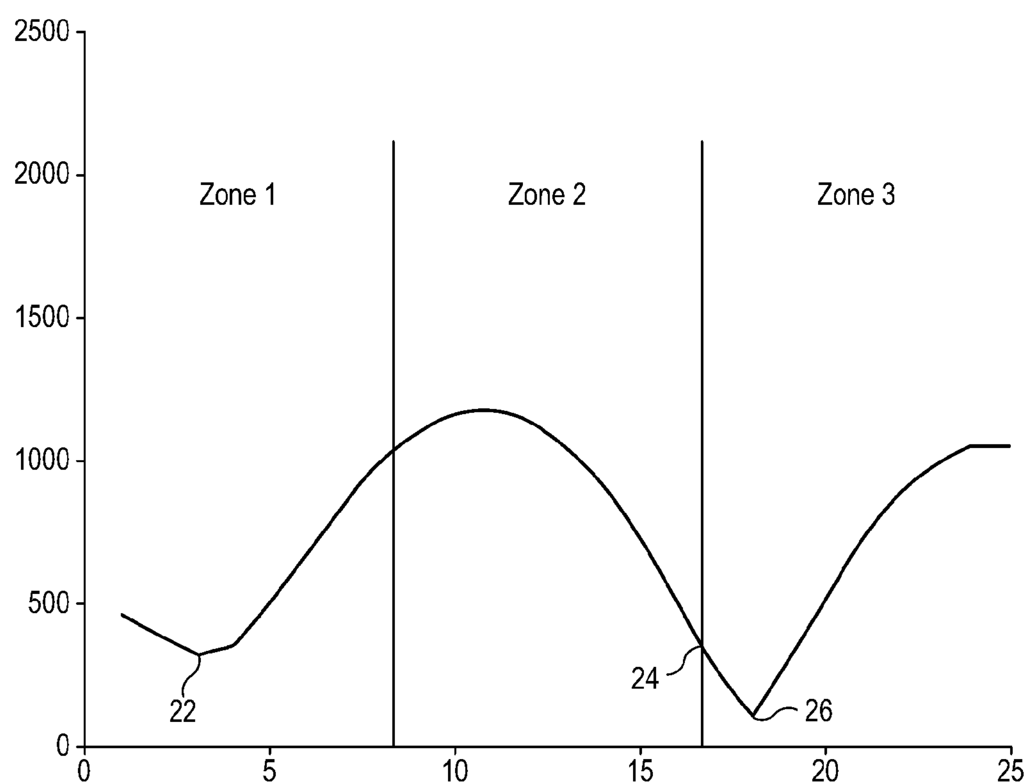
FIG. 2 is an illustration of a correlation curve, divided into zones in accordance with the present invention.

FIG. 2 illustrates a correlation curve calculated over 25 taps, i.e. calculated for 25 different possible interpolation schemes. A correlation curve is derived as described with reference to FIG. 1 using an SAD calculation for each possible interpolation scheme.

Rather than simply select the interpolation scheme with the lowest value, i.e. the minimum of the correlation curve, a method in accordance with the present invention uses a blend of the interpolation schemes found in different zones of the interpolation curve. In the example shown in FIG. 2, the correlation curve is divided into three zones, Zone 1, Zone 2 and Zone 3. However, it should be clear that the correlation curve can be split into more or less than three zones in a method in accordance with the invention.

For each zone, the minimum value of the curve is determined. The minimum value 22, 24, 26 in each zone corresponds to an interpolation scheme, and a blend of the three interpolation schemes corresponding to the minimum from each zone is used to construct the missing pixel. The three minimum values 22, 24, 26 are used to set up three different blending factors. The blending factors are used in a weighted sum of the interpolation schemes corresponding to the minimum points. Each of the minimum points corresponds to a pair of pixels that are more correlated than any other pair of pixels in that zone. This pair of pixels is used in the calculation of the pixel being reconstructed.

In another embodiment, instead of selecting the absolute minimum value for each zone, the smaller among the local minima should be considered (a local minimum of a curve is a point whose value is smaller than the one immediately before it and also smaller than the one immediately after it. In FIG. 2 points 22 and 26 are both absolute minimum and local minimum, while point 24 is only absolute minimum and not a local minimum). If there is more than one local minimum in a zone, the smallest one should used, while if there are no local minima in a zone (as in zone 2 of FIG. 2) the absolute minimum should be used.

Figure 3:
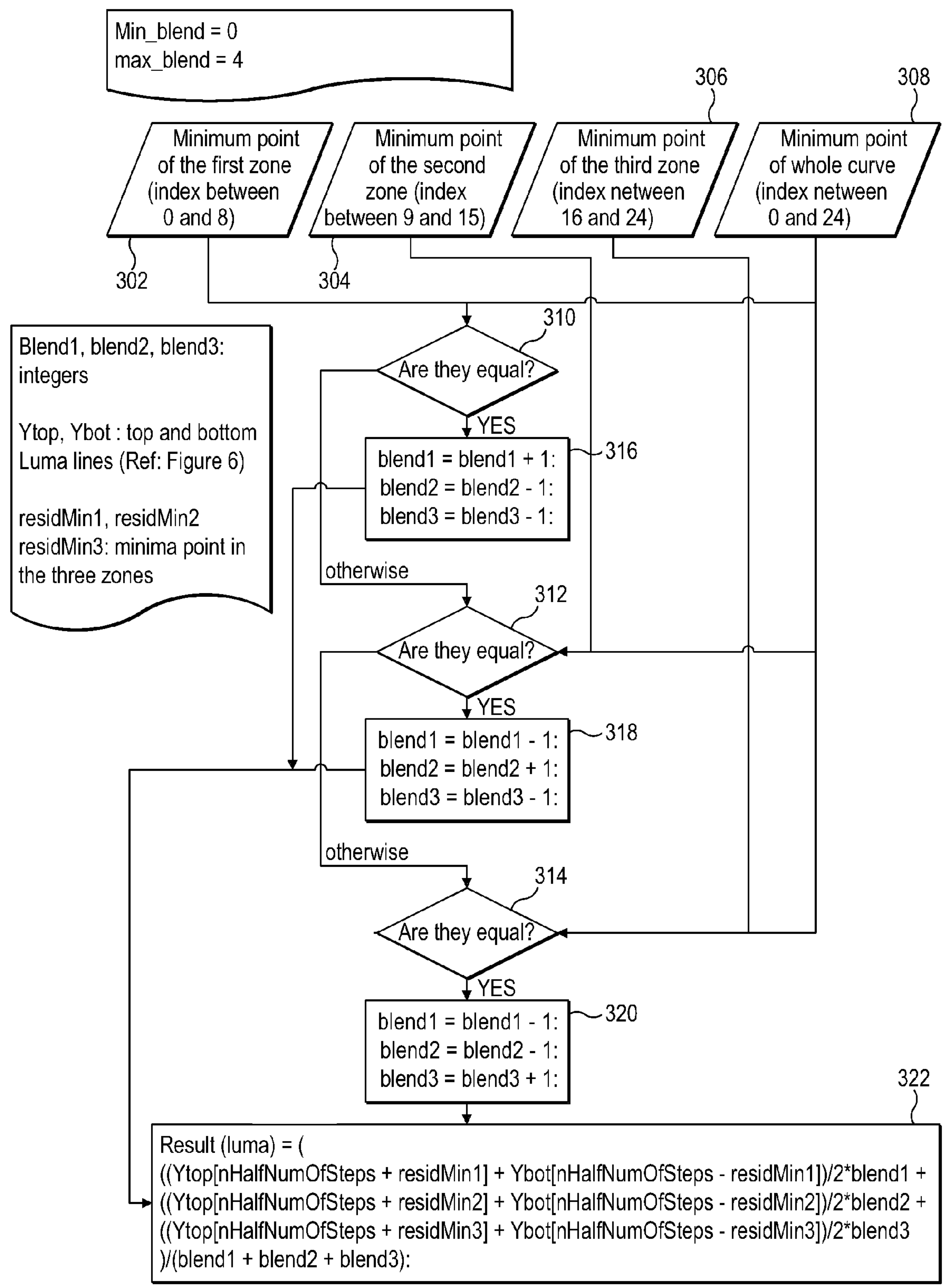
FIG. 3 is a flow diagram illustrating the selection of an interpolation scheme in accordance with the present invention.

FIG. 3 is a flow chart illustrating an example of a procedure in accordance with the invention, based on interpolation between rows of pixels belonging to the same field, as shown in FIG. 1. The three blending values assigned to the three candidate solution pairs of pixels corresponding to the three minima of FIG. 2 are combined in a weighted average. The weight coefficients, or blending values, are adjusted based on which of the three candidate solutions is likely to be the best.

In this example the blending factors are updated for each pixel reconstructed based in part on the blending factors used for the preceding pixel. However, preferably the blending factors are reset to a predetermined value at the end or at the beginning of each line of missing video data, e.g. 0, 4 and 0. As illustrated in FIG. 3, each of the blending factors are also limited to a maximum value, in this case four, and are limited to a minimum value of zero.

The process illustrated in FIG. 3 can be summarised as follows. In a first step 302, 304, 306, the minimum point of each zone of the correlation curve is determined. In this example there are three zones, as illustrated in FIG. 2. The minimum point of the entire correlation curve is also determined. This is shown in step 308. In steps 310, 312 and 314 the minimum for each zone is compared with the minimum of the complete correlation curve to determine which of the zonal minimum points corresponds to the absolute minimum point. The blending factor for the interpolation scheme corresponding to the minimum point of the whole curve is incremented by one. The blending factor for the interpolation schemes corresponding to the minimum points of the other two zones are decremented by one. This is illustrated in steps 316, 318 and 320. In step 322 the luminance value of the pixel to be reconstructed is calculated as a weighted sum of the values derived from the interpolation schemes corresponding to each of the minimum points selected for the three zones using the blending factors calculated in steps 316, 318 and 320.

In the nomenclature of FIG. 3, blend1, blend2 and 3 are the three blending values used for the interpolation schemes taken from zones 1, 2 and 3 of the correlation curve, nHalfNumOfSteps identifies the middle point of the correlation curve, Ytop is the value of the row of pixels above the pixel to be reconstructed, Ybot is the luminance value of the row of pixels below the pixel to be reconstructed.

The method as illustrated in FIG. 3 can clearly be readily adapted for more than three zones or for two zones. In the case of more than three zones, comparisons can be made between the minima found from each zone to determine a rank order of the minima, and blending factors updated according to that rank order. Alternatively, as shown in FIG. 3, it may be only the minimum corresponding to the minimum of whole curve that has its blending factor increased whilst all remaining blending factors are decreased or remain the same. Equally, rather than simply incrementing or decrementing blending factors, they may be multiplied by predetermined factors on the basis of a comparison between them.

Figure 4:
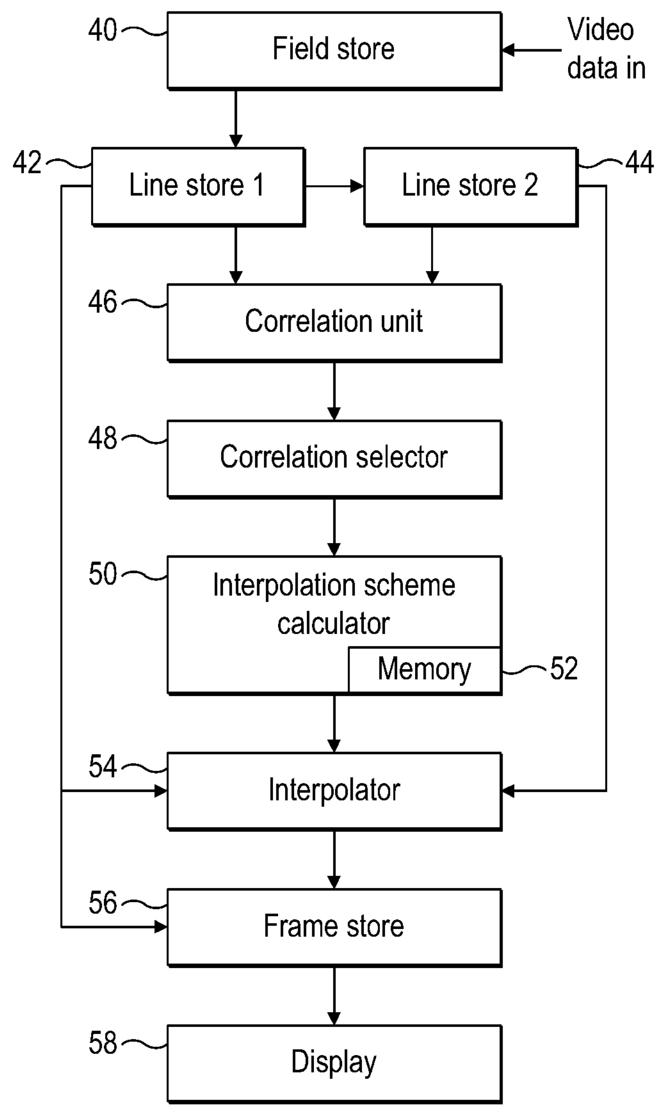
FIG. 4 is a block diagram of a system in accordance with the present invention.

FIG. 4 is a block diagram of a system appropriate for implementing a method as shown in FIG. 3. The system can be modified to accommodate variations in the method as described above, for example owing to the use of a greater number than three zones.

Input video data is fed to field store 40. The field store contains the field with the lines adjacent to the missing line which is to be reconstructed. Data is read out from field store 40 to a first line store 42 and then to a second line store 44. So, a line is first read by line store 42, and then that line is passed to line store 44, and a second line fed to line store 42. The two line stores then contain the two immediately adjacent fields to the missing line in the current field.

Next, for each pixel in turn to be reconstructed, the correlation unit 46 performs a sequence of correlations for the different interpolations which might be used to generate the missing pixel. This is done in a manner similar to that illustrated in FIG. 1, but with a greater number of interpolation schemes, to generate correlation data of the type shown in FIG. 2. The resultant correlation data is fed to the correlation selector, which divides the correlation data into zones and selects the correlation from each zone most likely to give the best interpolation scheme for generating the missing pixel. This corresponds to the minimum points in each of the zones in FIG. 2. The output of the correlation selector is then used by an interpolation scheme calculator 50 which carries out the steps illustrated in FIG. 3, to produce an interpolation scheme based on a blend of interpolation schemes selected from each zone of the correlation data. The interpolation scheme calculator 50 includes a memory or buffer 52 to store the blending factors used for the preceding pixel and a predetermined set of blending factors to be used at the start of each new line of missing video data. The interpolator 54 performs the calculation illustrated in box 322 of FIG. 3 to produce a luminance value for the pixel. The result of the calculation performed by the interpolator 54 is then fed to the frame store 56. The frame store 56 also receives data from line store 42, which corresponds to the already known video data adjacent lines of the current field. Once the frame store is full, the resultant video signal can be sent to a display 58 or can be stored.

The whole process takes place in real time so that it can be performed on a video signal being received by a television receiver which converts the signal into a non interpolator form ready for display.

Preferably, the system of FIG. 4 is included in the television receiver so that new receivers including the system can display a high resolution version of an interpolator signal without high frequency components.

In an improvement to the arrangement of FIG. 4, two or more sets of the same hardware may be provided, operating in parallel on different lines of the field store 40 to improve processing speed.

In an alternative, the system of FIG. 4 can be implemented in a dedicated processor. Two or more dedicated processors can be provided in parallel to improve the speed of processing.

The invention claimed is:

1. A method for converting an interlaced video signal to a non-interlaced video signal, comprising, for each pixel of a plurality of pixels in each of a plurality of missing lines of a video field in the interlaced video signal:

deriving a correlation data set comprising correlation data for each of a plurality of possible interpolation schemes to be used in reconstructing the pixel;

dividing the correlation data set into a plurality of correlation data zones, the dividing causing each correlation data zone to comprise correlation data for one or more of the interpolation schemes;

selecting an interpolation scheme from each of the correlation data zones; and reconstructing the pixel using a blend of the selected interpolation schemes, wherein the respective blend for each pixel of a plurality of pixels subsequent to a first pixel is determined based on a result of a comparison between the selected interpolation schemes and based on a blend used for reconstructing a spatially preceding pixel.

2. A method according to claim 1, further comprising the step of displaying the reconstructed pixel on a display.

3. A method according to claim 1, wherein the blend is determined based on the blend used for reconstructing a spatially preceding pixel is a blend used for reconstructing an immediately preceding pixel in a missing line in the video field containing the pixel.

4. A method according to claim 1, further comprising the step of resetting the blend to a predetermined blend at the beginning or end of each missing line in the video field.

5. A method according to claim 1, further comprising the step of comparing the correlation data for the selected interpolation schemes with one another.

6. A method according to claim 5, wherein the blend of selected interpolation schemes comprises a weighted sum of the result of each of the selected interpolation schemes, and wherein weight coefficients in the weighted sum are incremented or decremented from the weight coefficient for the interpolation scheme from the same correlation data zone used for the immediately preceding pixel, the amount of increment or decrement being based on the result of the step of comparing the correlation data for the selected interpolation schemes with one another.

7. A method according to claim 5, wherein the step of comparing the correlation data for the selected interpolation schemes with one another comprises determining the interpolation scheme likely to give the best result.

8. A method according to claim 7, wherein the weight coefficient for the interpolation scheme determined to be likely to give the best result is incremented from the weight coefficient for the interpolation scheme from the same correlation data zone used for the immediately spatially preceding pixel.

9. A method according to claim 1, wherein the step of dividing each correlation data set into a plurality of correlation data zones comprises dividing the correlation data into zones in accordance with the spatial or temporal properties of the corresponding interpolation schemes.

10. A method according to claim 1, wherein the correlation data for each interpolation scheme is a measure of the correlation between pixel pairs using that interpolation scheme.

11. A method according to claim 10, wherein the step of selecting an interpolation scheme from each correlation data zone comprises selecting an interpolation scheme from each correlation data zone having the greatest degree of correlation between pixel pairs using that interpolation scheme.

12. A method according to claim 10, wherein the step of selecting an interpolation scheme from each correlation data zone comprises selecting an interpolation scheme for each correlation data zone for which the correlation data is the lowest local minimum in that correlation data zone in a graphical representation of the correlation data set, and, if no local minimum exists for a correlation data zone, selecting an interpolation scheme for which the correlation data is the absolute minimum for that correlation data zone, wherein a lower value for correlation data in the graphical representation indicates a greater degree of correlation between pixel pairs using the corresponding interpolation scheme.

13. An apparatus for converting an interlaced video signal to a non-interlaced video signal comprising:

a correlation unit configured for deriving a correlation data set comprising correlation data for each of a plurality of possible interpolation schemes to be used in reconstructing a pixel in a missing line of a video field in the video signal;

a selector configured for dividing each correlation data set into a plurality of correlation data zones, the dividing causing each correlation data zone to comprise correlation data for one or more of the interpolation schemes, and for selecting a respective interpolation scheme from each correlation data zone; and an interpolator configured for reconstructing the pixel using a blend of the selected interpolation schemes, wherein the interpolator is configured to determine the blend for the pixel based on a result of a comparison between the selected interpolation schemes and based on the blend used for a spatially preceding pixel.

14. An apparatus according to claim 13, further comprising a display for displaying the reconstructed pixel.

15. An apparatus according to claim 13, wherein the interpolator is configured to determine the blend based on a blend used for an immediately preceding pixel in the missing line in the video field.

16. An apparatus according to claim 13, wherein the interpolator is configured to compare the correlation data for the selected interpolation schemes with one another.

17. An apparatus according to claim 16, wherein the interpolator is configured to determine the blend of selected interpolation schemes using a weighted sum of a result of each of the selected interpolation schemes, and to increment or decrement weight coefficients in the weighted sum from the weight coefficient for the interpolation scheme from the same correlation data zone used for the immediately preceding pixel, the amount of increment or decrement being based on a result of a comparison of the correlation data for the selected interpolation schemes with one another.

18. An apparatus according to claim 16, wherein the interpolator is configured to determine the interpolation scheme from the selected interpolation schemes likely to give the best result.

19. An apparatus according to claim 18, wherein the interpolator is configured to increment the weight coefficient for the interpolation scheme determined to be likely to give the best of the selected interpolation schemes from the weight coefficient for the interpolation scheme from the same correlation data zone used for an immediately spatially preceding pixel.

20. An apparatus according to claim 13, wherein the selector is further configured to divide the correlation data into zones in accordance with spatial or temporal properties of the corresponding interpolation schemes.

21. An apparatus according to claim 13, wherein the correlation data for each interpolation scheme is a measure of the correlation between pixel pairs using that interpolation scheme.

22. An apparatus according to claim 21, wherein the selector is further configured to select an interpolation scheme from each correlation data zone having the greatest degree of correlation between pixel pairs from among the possible interpolation schemes.

23. An apparatus according to claim 21, wherein the selector is further configured to select an interpolation scheme for each correlation data zone for which the correlation data is the lowest local minimum in that correlation data zone in a graphical representation of the correlation data set, and, if no local minimum exists for a correlation data zone, select an interpolation scheme for which the correlation data is the absolute minimum for that correlation data zone, wherein a lower value for correlation data in the graphical representation indicates a greater degree of correlation between pixel pairs using the corresponding interpolation scheme.

24. A method for converting an interlaced video signal to a non-interlaced video signal, comprising, for each pixel of a plurality of pixels in each of a plurality of missing lines of a video field in the interlaced video signal:

deriving a correlation data set comprising correlation data for each of a plurality of possible interpolation schemes to be used in reconstructing the pixel;

dividing the correlation data set into a plurality of correlation data zones, the dividing causing each correlation data zone to comprise correlation data for one or more of the interpolation schemes;

selecting an interpolation scheme from each of the correlation data zones;

comparing the correlation data for the selected interpolation schemes with one another to produce a comparison result;

forming a blend of the selected interpolation schemes by forming a weighted sum of a result of each of the selected interpolation schemes, the forming comprising determining weight coefficients for the weighted sum by incrementing or decrementing a corresponding weight coefficient for a respective interpolation scheme for the same correlation data zone used for an immediately preceding pixel, wherein an amount of increment or decrement is based on the comparison result;

reconstructing the pixel using the blend of the selected interpolation schemes.

* * * * *